United States Patent
Galasso

(10) Patent No.: US 10,472,017 B2
(45) Date of Patent: *Nov. 12, 2019

(54) LOWER FORK ALIGNMENT SYSTEM

(71) Applicant: Fox Factory, Inc., Scotts Valley, CA (US)

(72) Inventor: Mario Galasso, Sandy Hook, CT (US)

(73) Assignee: Fox Factory, Inc., Braselton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/044,193

(22) Filed: Jul. 24, 2018

(65) Prior Publication Data

US 2018/0327046 A1 Nov. 15, 2018

Related U.S. Application Data

(60) Continuation of application No. 15/614,314, filed on Jun. 5, 2017, now Pat. No. 10,040,505, which is a division of application No. 14/505,342, filed on Oct. 2, 2014, now Pat. No. 9,669,892.

(60) Provisional application No. 62/053,618, filed on Sep. 22, 2014.

(51) Int. Cl.
*B62K 21/02* (2006.01)

(52) U.S. Cl.
CPC .................................. *B62K 21/02* (2013.01)

(58) Field of Classification Search
CPC .................................................. B62K 21/02
See application file for complete search history.

(56) References Cited

U.S. PATENT DOCUMENTS

| | | | | |
|---|---|---|---|---|
| 4,558,765 A | * | 12/1985 | Hogan | B62L 1/14 188/24.19 |
| 4,632,225 A | * | 12/1986 | Mathauser | B62L 3/023 188/24.18 |
| 5,238,259 A | * | 8/1993 | Wilson | B62K 25/08 280/276 |
| 6,220,399 B1 | * | 4/2001 | Phillips | B62L 1/10 188/24.21 |
| 8,448,752 B2 | * | 5/2013 | Moore | B62L 1/10 188/24.12 |
| 9,669,892 B2 | * | 6/2017 | Galasso | B62K 21/02 |
| 10,040,505 B2 | | 8/2018 | Galasso | |
| 2004/0084871 A1 | | 5/2004 | Galasso | |
| 2009/0243251 A1 | | 10/2009 | Galasso et al. | |
| 2014/0145413 A1 | * | 5/2014 | Baltaxe | B62K 21/02 280/279 |
| 2017/0320535 A1 | * | 11/2017 | Galasso | B62K 21/02 |

* cited by examiner

*Primary Examiner* — Jacob D Knutson

(57) ABSTRACT

A lower fork alignment system for a vehicle is described. The lower fork alignment system includes: a brace detachably coupling a first lower tube and a second lower tube of a lower fork, wherein the first and second lower tubes include: first and second receiving adjustment mechanism configured for receiving corresponding interfacing mechanisms of the brace, wherein upon receipt of alignment features of the interfacing mechanisms, one of the first lower tube and the second lower tube is enabled to be adjusted in a horizontal direction along a horizontal axis, and the other of the first lower tube and the second lower tube is enabled to be adjusted in a vertical direction along a vertical axis.

15 Claims, 11 Drawing Sheets

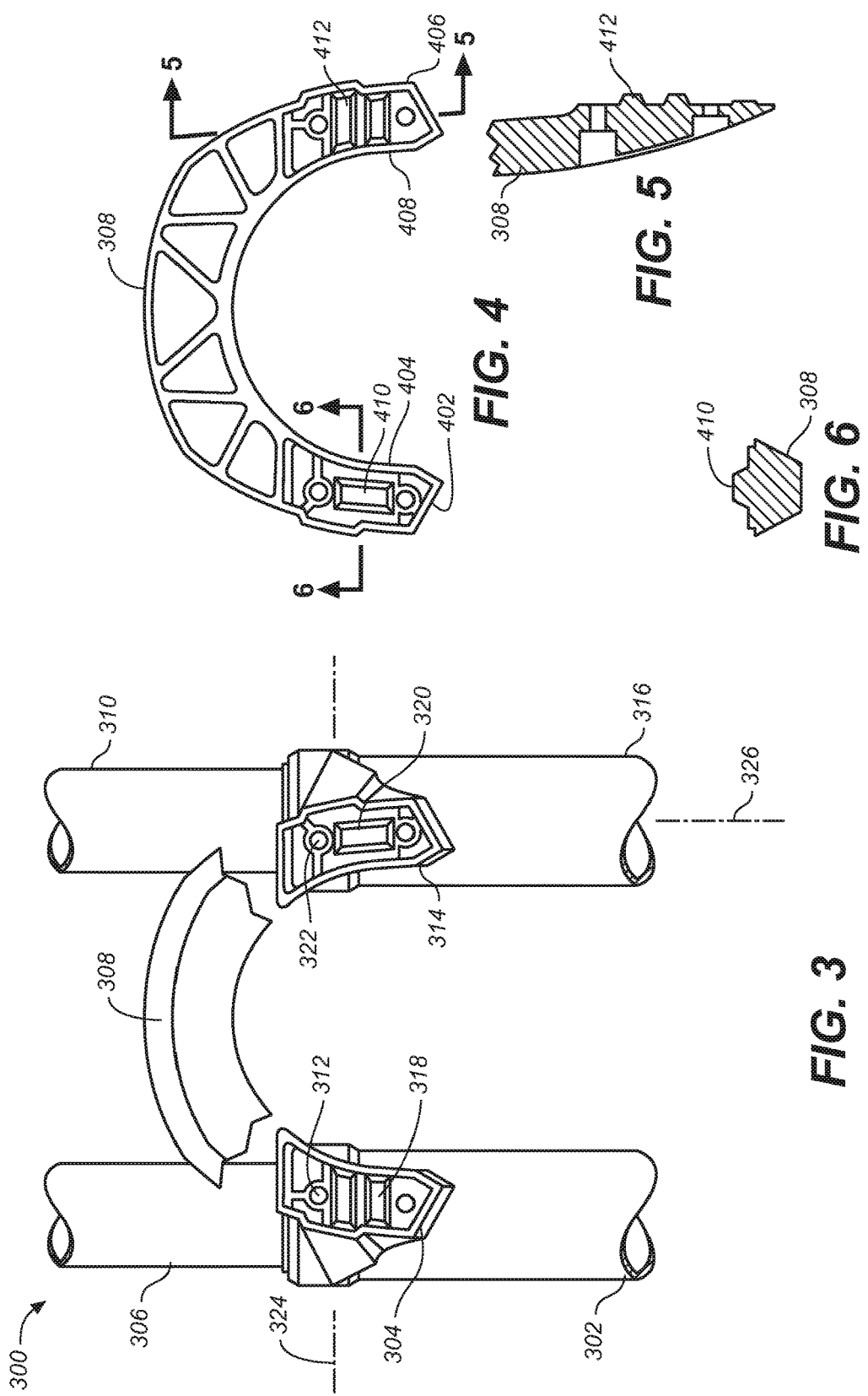

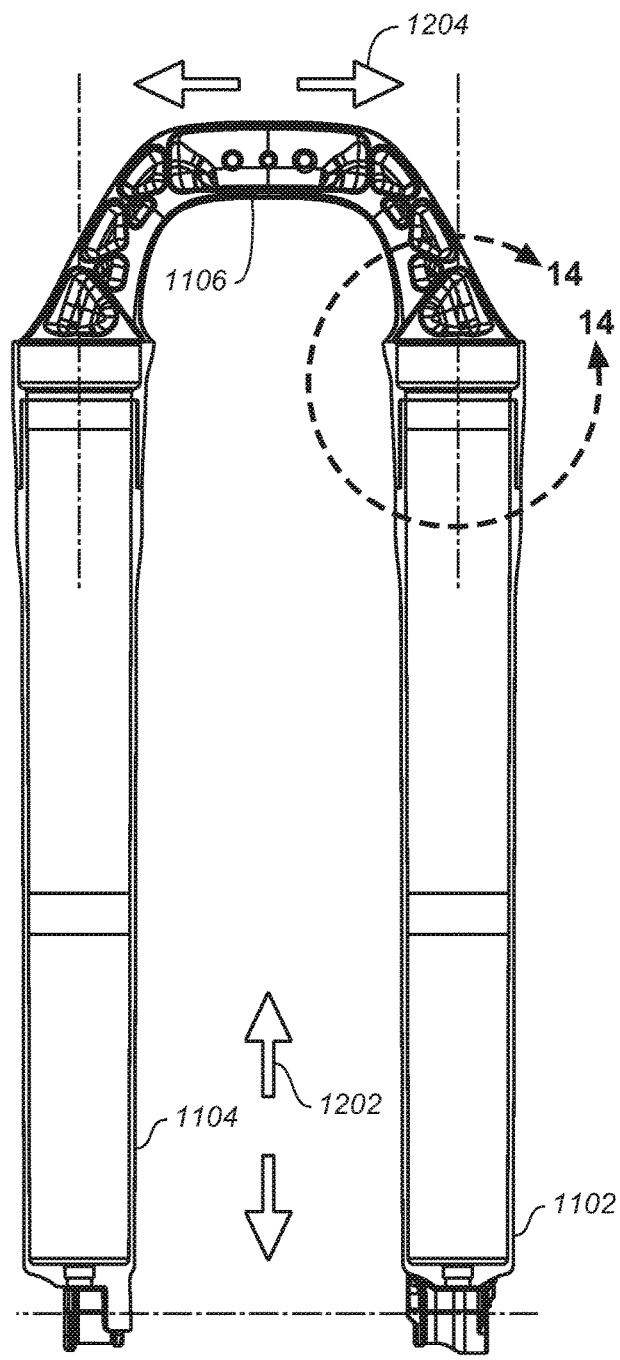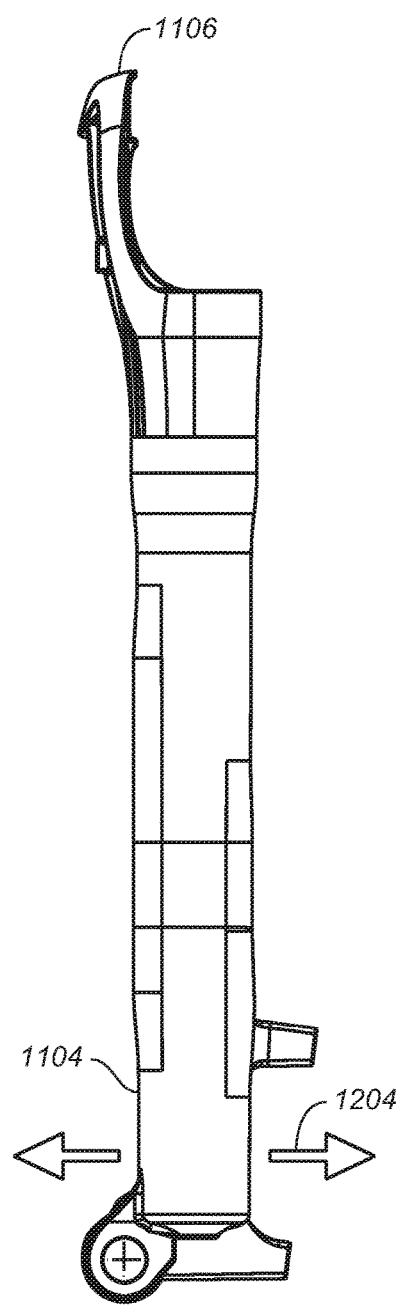
FIG. 12  FIG. 13

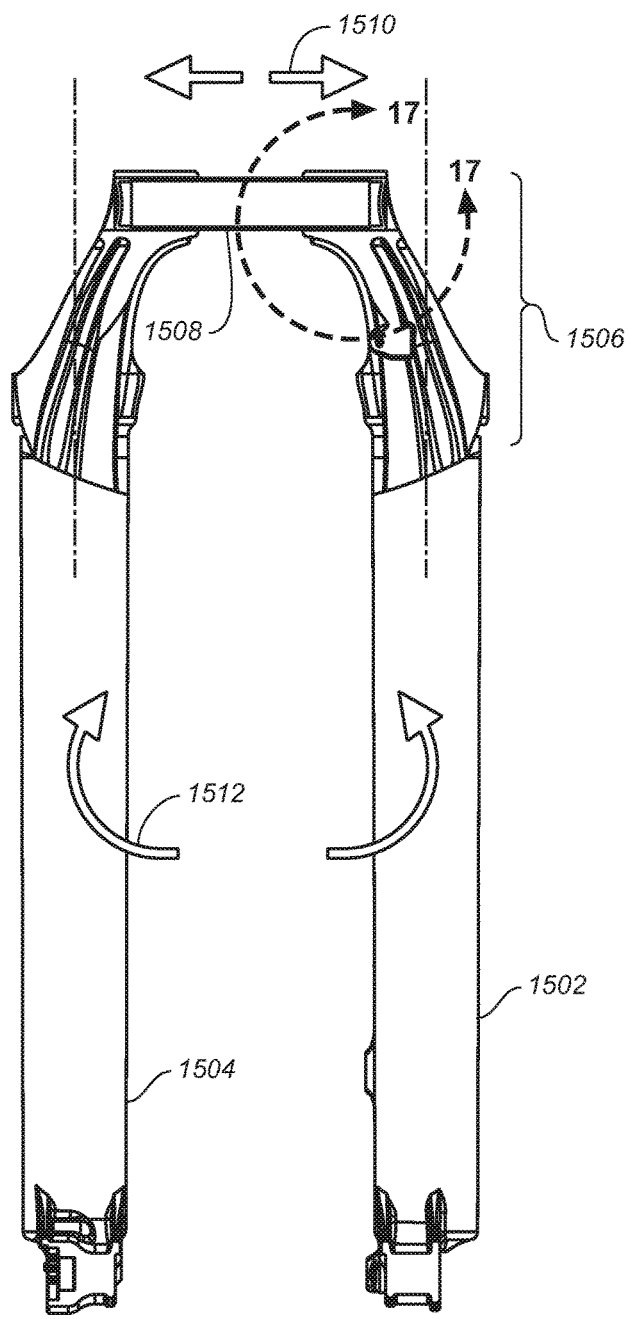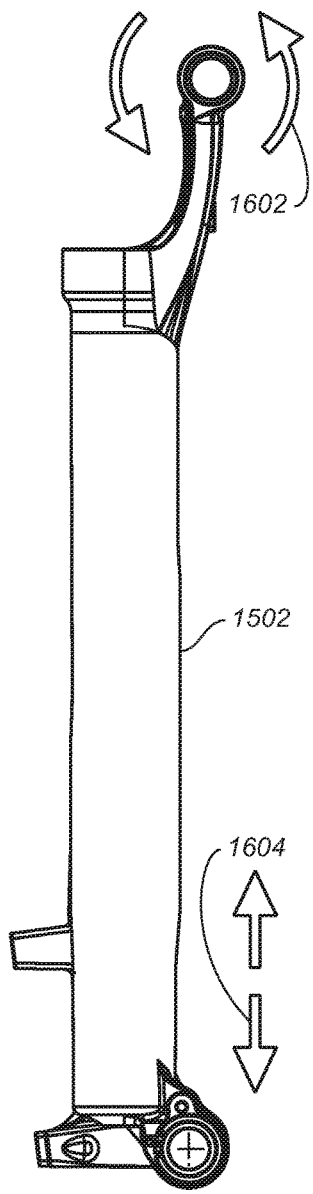
FIG. 15                    FIG. 16

LOWER FORK ALIGNMENT SYSTEM

CROSS-REFERENCE TO RELATED APPLICATIONS

This patent application is a continuation application of and claims the benefit of U.S. patent application Ser. No. 15/614,314, filed Jun. 5, 2017, entitled, "LOWER FORK ALIGNMENT SYSTEM", by Mario Galasso, assigned to the assignee of the present application, which is incorporated herein in its entirety by reference thereto.

The patent application Ser. No. 15/614,314 is a divisional application of and claims the benefit of U.S. patent application Ser. No. 14/505,342, filed Oct. 2, 2014, now U.S. Issued U.S. Pat. No. 9,669,892, entitled, "LOWER FORK ALIGNMENT SYSTEM", by Mario Galasso, assigned to the assignee of the present application, which is incorporated herein in its entirety by reference thereto.

The patent application Ser. No. 14/505,342 claims priority to and benefit of U.S. provisional patent application 62/053,618, filed Sep. 22, 2014, entitled, "LOWER FORK ALIGNMENT SYSTEM", by Mario Galasso, assigned to the assignee of the present application, which is incorporated herein in its entirety by reference thereto.

FIELD OF THE INVENTION

Embodiments of the present technology relate generally to the field of wheeled vehicles.

BACKGROUND

A bicycle fork is the part of a bicycle that holds the front wheel and allows the rider to steer and balance the bicycle. The fork may consist of two telescopic tubes connected by a brace that keeps the telescopic tubes in parallel to one another during use.

Conventionally, during manufacturing, these telescopic tubes and connecting brace are cast and molded as a single piece. Typically, during the casting process, liquid metal is injected into a mold and let to cool to solidity. The flow patterns caused by the injection of the liquid metal introduce residual stress to the casted fork. Thus, due to this residual stress, the casted fork has a tendency to bend. Consequently, many times, the casted two fork legs, connected by the brace, are not quite parallel with each other. When upper fork legs are inserted into the casted and slightly unparallel lower legs, stiction may result, thereby making it more difficult for a suspension system to function as intended. Stiction refers to friction between the upper and the lower legs of the fork. Thus, limitations exist in conventional systems and methods relating to the vehicle fork legs. What is needed is a system and method of manufacture of lower fork legs that reduces the friction between the upper and the lower fork legs during operation.

BRIEF DESCRIPTION OF THE DRAWINGS

Aspects of the present invention are illustrated by way of example, and not by way of limitation, in the accompanying drawings, wherein:

FIG. 3 is a front perspective view of a relevant portion of a lower fork with a partial illustration of an attached brace and receiving adjustment mechanisms, in accordance with an embodiment.

FIG. 4 is a rear perspective view of an inner structure of the brace of FIG. 3 showing interfacing mechanisms, in accordance with an embodiment.

FIG. 5 is an enlarged perspective view of section A-A of FIG. 4, in accordance with an embodiment.

FIG. 6 is an enlarged perspective view of section B-B of FIG. 4, in accordance with an embodiment.

FIG. 12 is a front cross-sectional view of the brace of FIG. 11 coupling the right lower tube and the left lower tube, in accordance with an embodiment.

FIG. 13 is a side perspective view of assembled embodiments of FIG. 12, in accordance with an embodiment.

FIG. 15 is a front perspective view of a brace coupled to a right and a left lower tube, in accordance with an embodiment.

FIG. 16 is a side perspective view of the assembled brace of FIG. 15 and the right and left lower tubes, in accordance with an embodiment.

Figure 1:
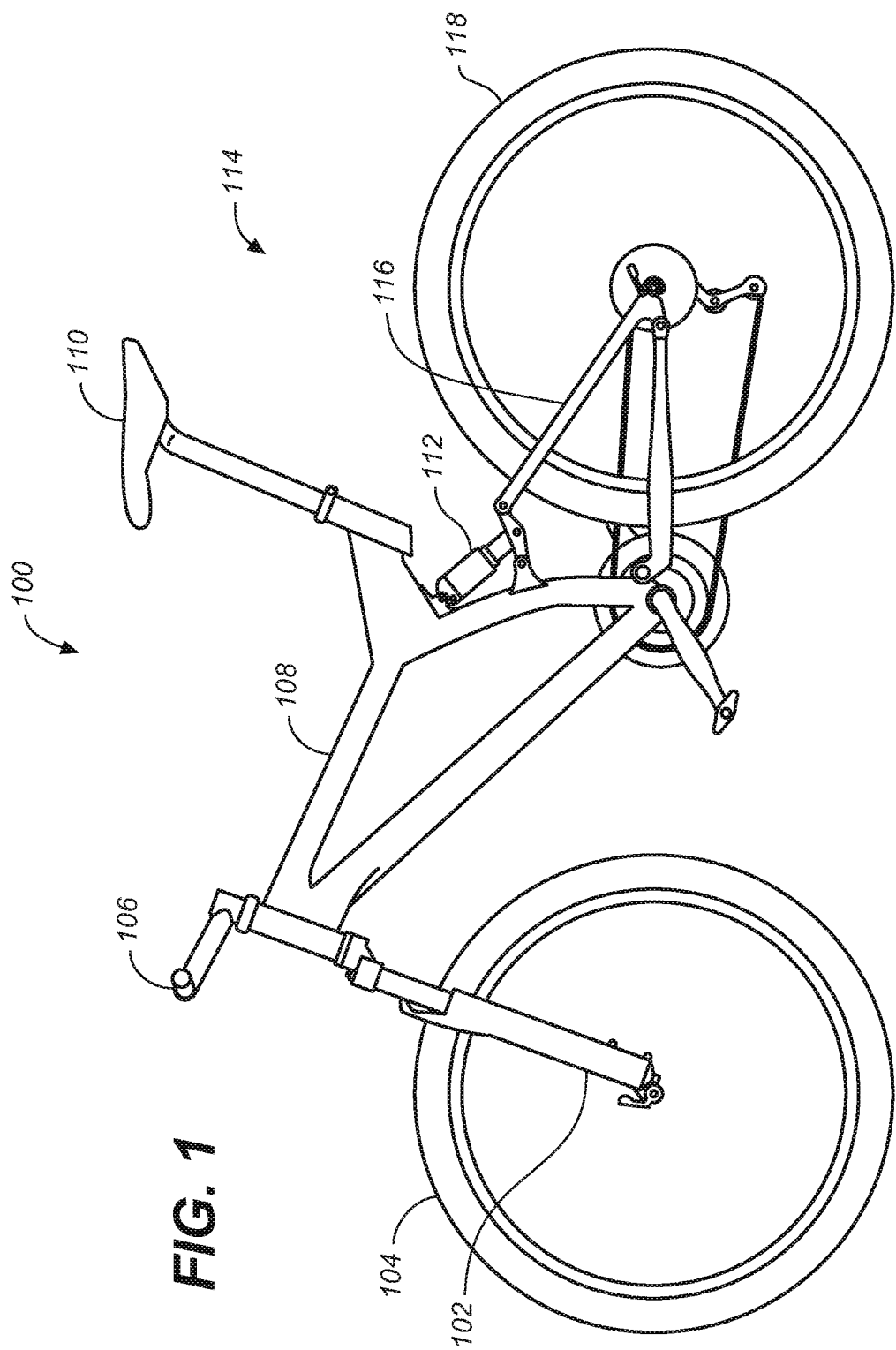
FIG. 1 is a perspective view of a conventional bicycle, in accordance with an embodiment.

The drawings referred to in this description should be understood as not being drawn to scale except if specifically noted.

SUMMARY OF EMBODIMENTS

One embodiment is a lower fork alignment system that includes: a brace detachably coupling a first lower tube and a second lower tube of a lower fork, wherein the first and second lower tubes include: first and second receiving adjustment mechanism configured for receiving corresponding interfacing mechanisms of the brace, wherein upon receipt of alignment features of the interfacing mechanisms, one of the first lower tube and the second lower tube is enabled to be adjusted in a horizontal direction along a horizontal axis, and the other of the first lower tube and the second lower tube is enabled to be adjusted in a vertical direction along a vertical axis.

One embodiment includes a lower fork alignment system for a vehicle. According to the embodiment, the lower fork alignment system includes: a lower fork that includes: a brace coupling a first lower tube to a second lower tube, wherein the first lower tube includes: a first receiving adjustment mechanism disposed at a first end of the first lower tube, wherein the first receiving adjustment mechanism is configured for receiving a corresponding first interfacing mechanism of the brace, wherein the first receiving adjustment mechanism includes: a first alignment feature enabling a horizontal adjustment of the first lower tube relative to the second lower tube and along a horizontal axis. The second lower tube includes: a second receiving adjustment mechanism disposed at a first end of the second lower tube. The second receiving adjustment mechanism is configured for receiving a corresponding second interfacing mechanism of the brace. The second receiving adjustment mechanism includes: a second alignment feature enabling a vertical adjustment of the second lower tube relative to the first lower tube and along a vertical axis.

One embodiment includes a brace for coupling a first lower tube to a second lower tube of a lower fork. The brace includes: a first end; a second end; a first interfacing mechanism disposed at the first end, wherein the first interfacing mechanism is configured for being inserted into a corresponding first receiving adjustment mechanism of a first lower tube of a lower fork and includes: at least one raised horizontal rectangular shape configured for being inserted into the first receiving adjustment mechanism of the first lower tube, wherein upon receipt, the first lower tube may be slid in a horizontal direction along a horizontal axis; and a second interfacing mechanism disposed at the second end, wherein the second interfacing mechanism is configured for being inserted into a corresponding second receiving adjustment mechanism of a second lower tube of a lower fork and includes: at least one raised vertical rectangular shape configured for being inserted into the second receiving adjustment mechanism of the second lower tube, wherein upon receipt, the second lower tube may be slid in a vertical direction along a vertical axis.

One embodiment includes a lower tube of a lower fork of a vehicle. The lower tube includes: a receiving adjustment mechanism disposed at a first end of the lower tube, wherein the receiving adjustment mechanism is configured for receiving a corresponding interfacing mechanism of a brace. The receiving adjustment mechanism includes: an alignment feature enabling one of a horizontal adjustment and a vertical adjustment of the lower tube relative to another lower tube of the lower fork and adjusted along one of a horizontal axis and a vertical axis, respectively.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

This patent application describes the invention in the context of an example embodiment of the lower front fork for a bicycle. However, the teachings and scope of the invention are equally applicable to other lower fork assemblies for any two-wheeled vehicle.

Overview of Discussion

Embodiments disclosed herein include a lower fork alignment system for coupling two lower fork legs together with a brace and enabling improved alignment of the left and right lower fork legs of a bicycle by allowing for mid-assembly horizontal, vertical and rotational adjustment of the lower fork legs via the brace. Significantly, the brace, the right lower tube and the left lower tube are assembled after being manufactured as separate pieces. During assembly, pieces may be individually adjusted to attain a desired alignment relative to each other. When properly aligned, the telescopic movement of the upper tubes within the lower tubes remains near or at the lowest friction level. Once the lower fork legs are positionally adjusted such that the lower fork legs are aligned within the same horizontal and vertical planes, then embodiments enable the stabilization of these adjusted positions through attachment features found in both the brace and the lower fork legs (e.g., bolt holes, screw holes, glue cavities, etc.).

The following discussion will begin with a brief description of a conventional bicycle (See FIG. 1), a conventional bicycle front lower fork manufactured as a single molded piece (See FIG. 2), and the problems associated therewith. The discussion turns to a description of various embodiments, including: a brace that is attached to the lower fork legs using horizontal and vertical attachment bars (See FIGS. 3-10); a brace that couples lower fork legs using a matching positive and negative spline features and is glued onto lower fork legs (See FIGS. 11-14); and a center bridge that may be used as a brace or as part of a brace of prior described embodiments (See FIGS. 15-17).

FIG. 1 illustrates an off-road bicycle, or mountain bike 100, including a frame 114 which is comprised of a main frame portion 108 and a swing arm portion 116. The swing arm portion 116 is pivotally attached to the main frame portion 108. The bicycle 100 includes front and rear wheels 104 and 118, respectively, connected to the main frame 108. A seat 110 is connected to the main frame 108 in order to support a rider of the bicycle 100.

The front wheel 104 is supported by a front fork 102 which, in turn, is secured to the main frame 108 by a handlebar assembly 106. The rear wheel 118 is connected to the swing arm portion 104 of the frame 114. A rear shock 112 is positioned between the swing arm 116 and the frame 108 to provide resistance to the pivoting motion of the swing arm 116. Thus, the illustrated bicycle 100 includes suspension members between the front and the rear wheels 104 and 118, respectively, and the frame 114, which operate to substantially reduce wheel impact forces from being transmitted to the rider of the bicycle 100.

Figure 2:
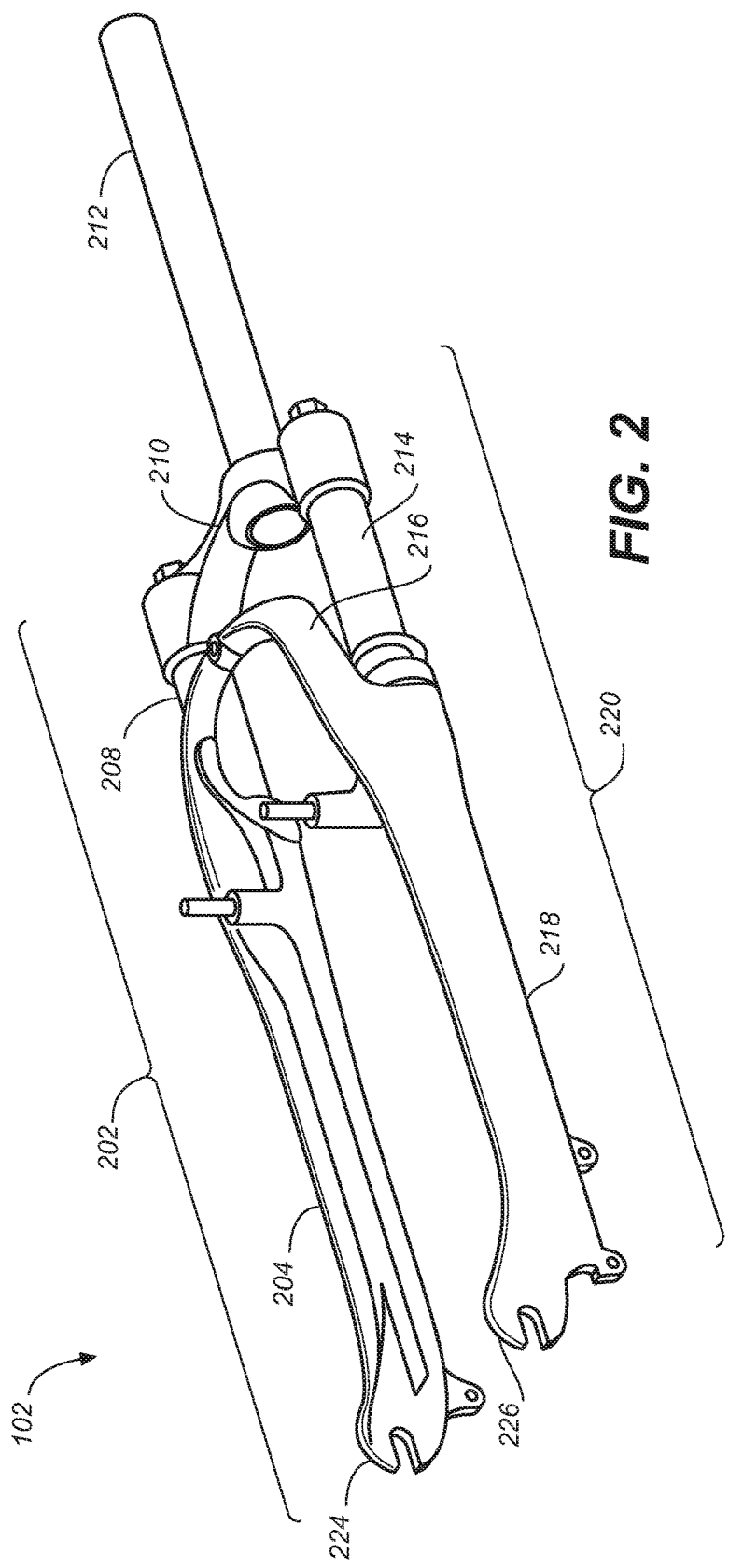
FIG. 2 is a perspective view of a front fork having a spring and damper therein.

FIG. 2 illustrates the front fork 102 as being detached from the bicycle 100 of FIG. 1. The front fork 102 include right and left legs, 202 and 220, respectively, as referenced by a person in a riding position on the bicycle 100. The right leg 202 includes a right upper tube 208 telescopingly received in a right lower tube 204. Similarly, the left leg 220 includes a left upper tube 214 telescopingly received in a left lower tube 218. A crown 210 connects the right upper tube 208 to the left upper tube 214 thereby connecting the right leg 202 to the left leg 220 of the front fork 102. In addition, the crown 210 supports a steerer tube 212, which passes through, and is rotatably supported by, the frame 114 of the bicycle 100. The steerer tube 212 provides a means for connection of the handlebar assembly 106 to the front fork 102, as illustrated in FIG. 1.

Each of the right lower tube 204 and the left lower tube 218 includes dropouts 224 and 226, respectively, for connecting the front wheel 104 to the front fork 102. An arch 216 connects the right lower tube 204 and the left lower tube 218 to provide strength and minimize twisting thereof. The right lower tube 204, the left lower tube 218 and the arch 216 are formed as a unitary piece.

As the right lower tube 204, the left lower tube 218 and the arch 216 are formed as a unitary piece, it is not possible to make horizontal and vertical adjustments after the unitary piece has been casted. Therefore, due to the casting process, and the shrinking of the material post-casting, the resulting unitary piece has a tendency to bend. When portions of the unitary piece bends, such as when one or both of the right lower tube 204 and the left lower tube 218 slightly bend and/or twist, the right upper tube 208 and the left upper tube 214 have difficult sliding in and out of the right and left lower tubes 204 and 218, respectively, since friction occurs there between because the upper tubes 208 and 214 rub against the lower tubes 204 and 218.

Example Lower Fork Alignment System

Embodiments provide for the separate manufacture of a right lower tube, a left lower tube and a brace that connects the right and left lower tubes via receiving adjustment mechanisms, interfacing mechanisms and attachment mechanisms. The lower fork alignment system provided herein enables the horizontal and vertical alignment adjustment of the right lower tube, the left lower tube and/or the brace. Such alignment adjustment possibilities enable the right lower tube and the left lower tube to be adjusted to a desired alignment position relative to each other, thereby reducing the friction that develops due to improperly aligned lower fork tubes or the bending of lower forks due to post-casting stress.

FIG. 3 illustrates a brace coupling a right and left lower tube together, along with receiving adjustment mechanisms attached thereto, in accordance with an embodiment. More specifically, FIG. 3 shows a front fork 300 including a right upper tube 306 telescopically engaged with the right lower tube 302, and a left upper tube 310 telescopically engaged with a left lower tube 316. A right receiving adjustment mechanism 304 and a left receiving adjustment mechanism 314 are attached to the right lower tube 302 and the left lower tube 316, respectively. In one embodiment, the receiving adjustment mechanisms are molded onto the lower tubes in a casting process. However, in another embodiment, the receiving adjustment mechanisms are attached to the lower tubes in a manner suitable for operation with the vehicle, such as with bolts, screws, glue, etc.

In one embodiment, the right receiving adjustment mechanism 304 includes horizontal alignment features that constitute one or more depressions formed in a horizontal rectangular (bar) shape. The horizontal rectangular (bar) shape depression 318 formed within the right receiving adjustment mechanism 304 is configured to receive a raised horizontal rectangular (bar) shape formed on the brace 308 (as will be explained in detail with respect to FIGS. 4-6), such that the raised horizontal rectangular shape partially fills the horizontal bar shape depression 318. As shown, the right receiving adjustment mechanism 304 includes two horizontal rectangular shape depressions. It should be appreciated that embodiments may include one or more horizontal rectangular shape depressions.

As will be explained herein in more detail, the raised horizontal rectangular shape of the brace 308 will fit into the horizontal rectangular shape depression 318 such that the brace 308 may be shifted/adjusted horizontally by sliding the brace 308 in a direction along the horizontal axis 324. The raised horizontal rectangular shape is slid within the horizontal rectangular shape depression 318 until a desired distance between the right lower tube 302 and the left lower tube 316 is achieved. Of note, when providing the adjustment, the other end of the brace 308 is concurrently inserted into the left receiving adjustment mechanism 314 such that the brace 308 is coupled with the left lower tube 316.

In one embodiment, the left receiving adjustment mechanism 314 includes vertical alignment features that constitute one or more depressions formed in a vertical rectangular (bar) shape. The vertical rectangular (bar) shape depression 320 formed within the left receiving adjustment mechanism 314 is configured to receive a raised vertical rectangular (bar) shape formed on the brace 308 (as will be explained in detail with respect to FIGS. 4-6), such that the raised vertical rectangular shape partially fills the vertical bar shape depression 320. As shown, the left receiving adjustment mechanism 320 includes two vertical rectangular shape depressions. It should be appreciated that embodiments may include one or more vertical rectangular shape depressions.

As will be explained herein in more detail, the raised vertical rectangular shape of the brace 308 will fit into the vertical rectangular shape depression 320 such that the brace 308 may be shifted/adjusted vertically by sliding the brace 308 in a direction along the vertical axis 326. The raised vertical rectangular shape is slid within the vertical rectangular shape depression 320 until a desired vertical height of the left lower tube 316 relative to the right lower tube 302 is achieved. Of note, when providing the adjustment, the other end of the brace 308 is concurrently inserted into the right receiving adjustment mechanism 304 such that the brace 308 is coupled with the right lower tube 302.

It should also be appreciated that while the discussion focuses on the features (e.g., horizontal rectangular shape depression 318, etc.) attributed to the right receiving adjustment mechanism 304 and features (e.g., vertical rectangular shape depression 320, etc.) attributed to left receiving adjustment mechanism 314, the horizontal rectangular shape depression 318, in one embodiment, may be formed in the left receiving adjustment mechanism 314. Likewise, in one embodiment, the vertical rectangular shape depression 320 may be formed in the right receiving adjustment mechanism 304. Further, the corresponding raised horizontal rectangular shape and the raised vertical rectangular shape are formed on either end of the brace 308.

FIG. 3 also show attachment mechanisms 312 and 322, that being screw holes (or a first and second set of screw holes, wherein each "set" may contain one or more screw holes) configured for receiving screws upon the insertion of the raised horizontal and vertical rectangular shapes into the horizontal rectangular shape and vertical rectangular shape depressions, 318 and 320, respectively, formed in the right and left receiving adjustment mechanisms, 304 and 314, respectively. It should be understood that the attachment mechanism for maintaining the brace 308 firmly attached to the lower fork 300 may be any suitable means. In non-limiting examples, bolts, screws and/or glue may be used to attach the brace 308 to the right and left receiving adjustment mechanisms, 304 and 314, respectively. It should be noted that in one embodiment, the attachment mechanism that receives the glue is a cavity capable of receiving and holding the glue such that the glue may bond components together.

FIG. 4 illustrates a rear view of an inner structure of the brace 308 comprising a right interfacing mechanism 408 at a first end 406 and a left interfacing mechanism 404 at the second end 402, in accordance with an embodiment. In one embodiment, the right interfacing mechanism 408 has formed thereon at least one raised vertical rectangular shape 412, and the left interfacing mechanism 404 has formed thereon at least one raised horizontal rectangular shape 410. FIG. 5 is an enlarged perspective view of section A-A of FIG. 4, showing a raised horizontal rectangular shape of the at least one raised horizontal rectangular shape 412, in accordance with an embodiment. FIG. 6 is an enlarged perspective view of section B-B of FIG. 4, showing a raised vertical rectangular shape of the at least one raised vertical rectangular shape 410, in accordance with an embodiment.

As described herein, the at least one raised horizontal rectangular shape 412 is formed such that it fits into the at least one horizontal rectangular shape depression 318. Once inserted into the at least one horizontal rectangular shape depression 318, the at least one raised horizontal rectangular shape 412 may be slid horizontally in a horizontal direction along the horizontal axis 324, to adjust the right lower tube 302 in relation to the left lower tube 316. The at least one raised vertical rectangular shape 410 is formed such that it fits into the at least one vertical rectangular shape depression 320. Once inserted into the at least one vertical rectangular shape depression 320, the at least one raised horizontal rectangular shape 410 (and hence the left lower tube 316) may be slid vertically in a vertical direction along the vertical axis 326, to adjust the left lower tube 316 in relation to the right lower tube 302.

Figure 7:
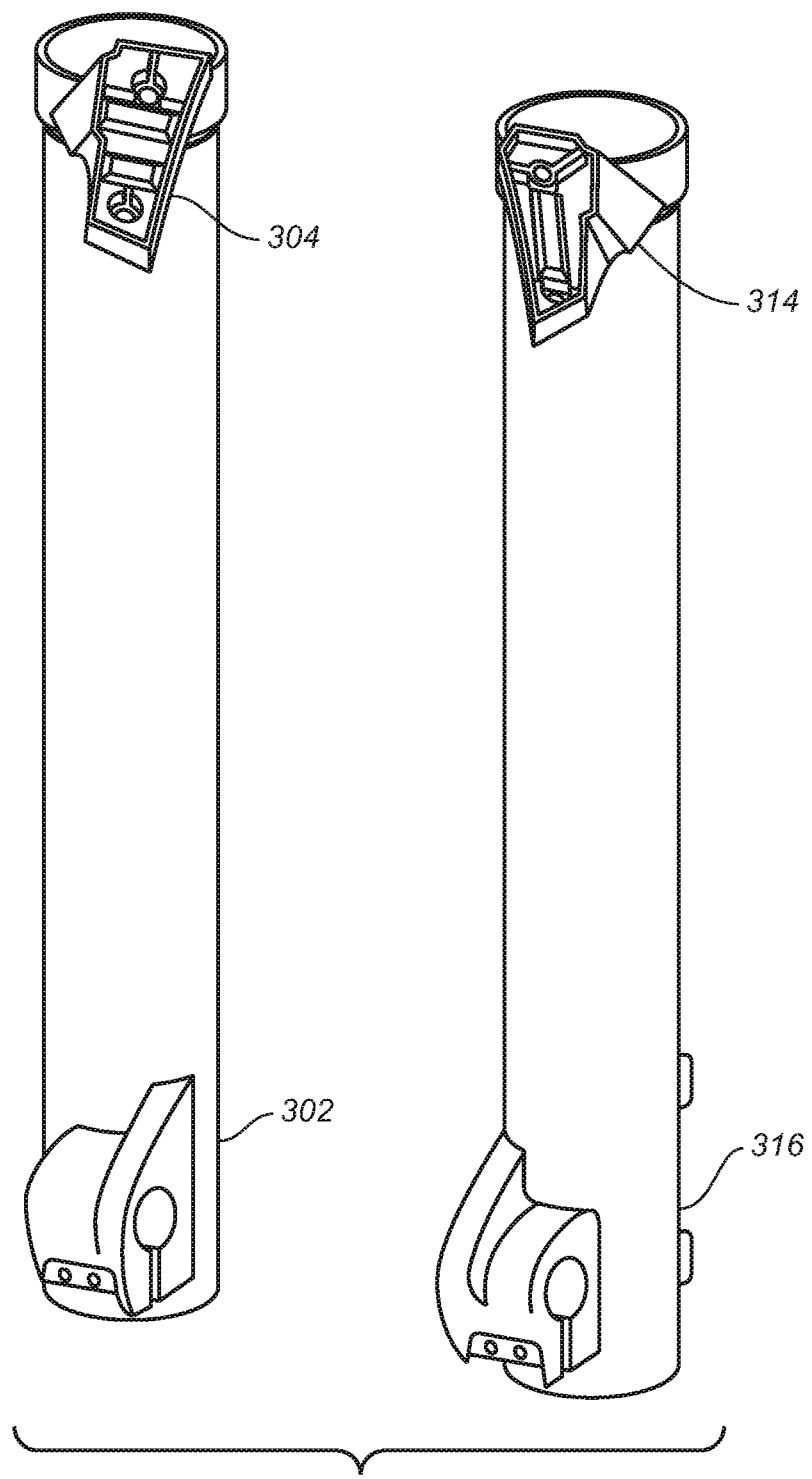
FIG. 7 is a ¾ perspective view of the lower tubes shown in FIG. 3, in accordance with an embodiment.

FIG. 7 illustrates the left lower tube 316 and the right lower tube 302, having attached thereon the left receiving adjustment mechanism 314 and the right receiving adjustment mechanism 304, respectively, in accordance with an embodiment.

Figure 8:
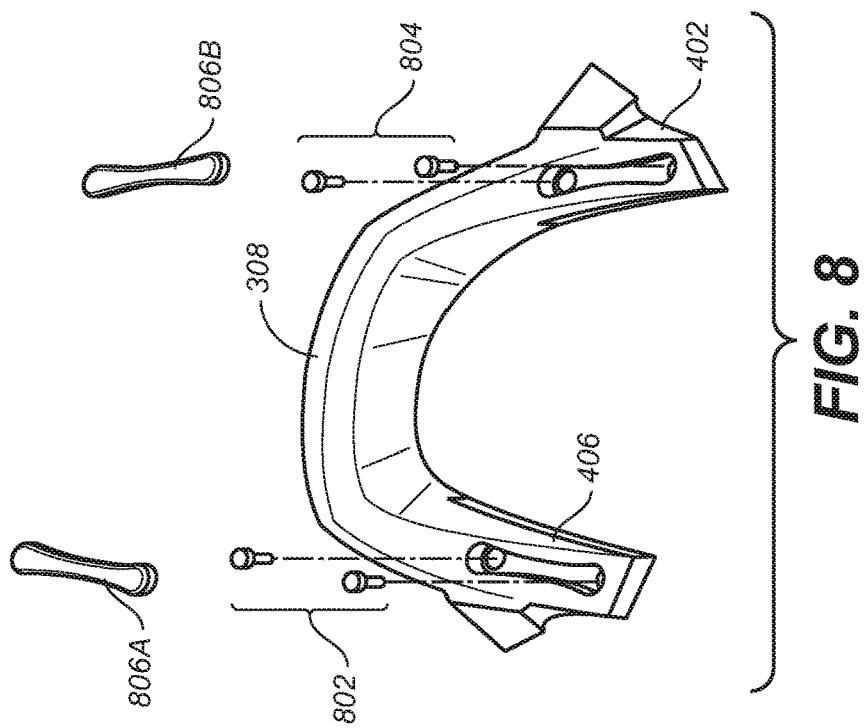
FIG. 8 is a ¾ perspective view of the brace of FIG. 3, screws for inserting into the brace, and molded covers for covering the screws, in accordance with an embodiment.

FIG. 8 illustrates, according to an embodiment, the brace 308, set of screws 802 and 804 for inserting into the brace 308 and the right and left receiving adjustment mechanisms 304 and 314, respectively, and molded covers 806A and 806B for covering the set of screws 802 and 804, respectively.

With reference now to FIGS. 7 and 8, a method of assembling embodiments provided herein may be described. For example, the first end 406 of the brace 308 is placed onto the right receiving adjustment mechanism 304. The second end 402 of the brace 308 is placed onto the left receiving adjustment mechanism 314. Then, the brace 308 or the right lower tube 302 is adjusted horizontally along the horizontal axis 324 and/or the brace 308 or the left lower tube 316 is adjusted vertically along the vertical axis 326.

Once the brace 308 is adjusted as desired in relation to the right lower tube 302 and the left lower tube 316, then the set of screws 802 and 804 are inserted into the attachment mechanisms 312 and 322, respectively. As noted, while in one embodiment screws are used, it should be appreciated that any suitable manner of attachment may be used to attach the brace 308 to the right lower tube 302 and the left lower tube 316.

Once the set of screws 806A and 806B are inserted into the attachment mechanisms 312 and 322, respectively, then molded covers 806A and 806B are placed over the visible heads of the set of screws 806A and 806B, respectively. The molded cover is formed to cover the screws, bolts, etc., and is made of plastic, in one embodiment. The molded cover, in one embodiment, slips over and around the heads of the screws or bolts, and includes any manner of suitable mechanisms enabling attachment to the screws or bolts. For example, in one embodiment, the molded cover may be formed such that the molded cover stretches slightly and its outer edges contain a lip that curves inward and under the molded cover and that enables the molded cover to slip over and around the outer edges of the screws or bolts. In another embodiment, glue is used to hold the molded cover in place.

Figure 9:
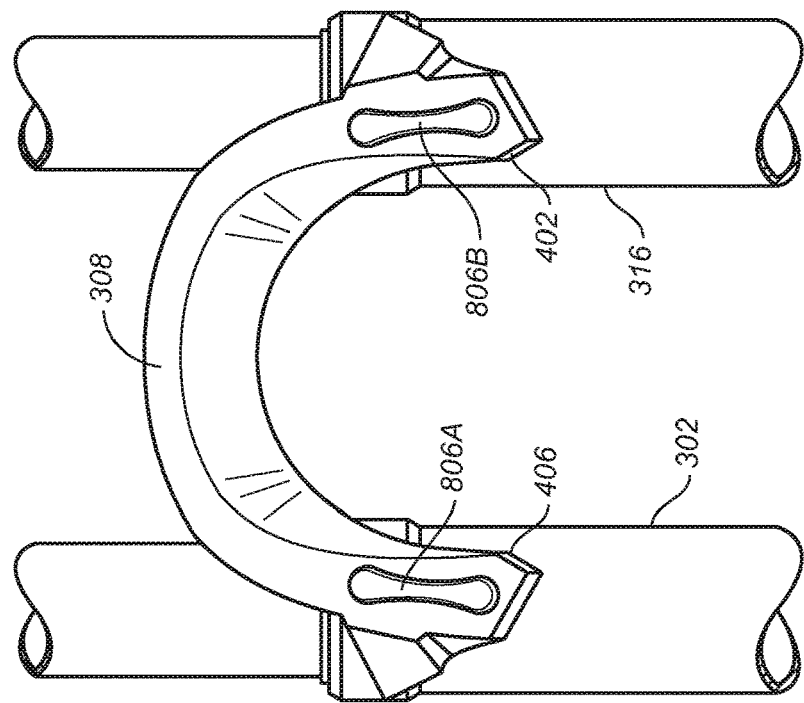
FIG. 9 is a front perspective view of the brace of FIG. 3 coupling the right lower tube and the left lower tube, in accordance with an embodiment.
Figure 10:
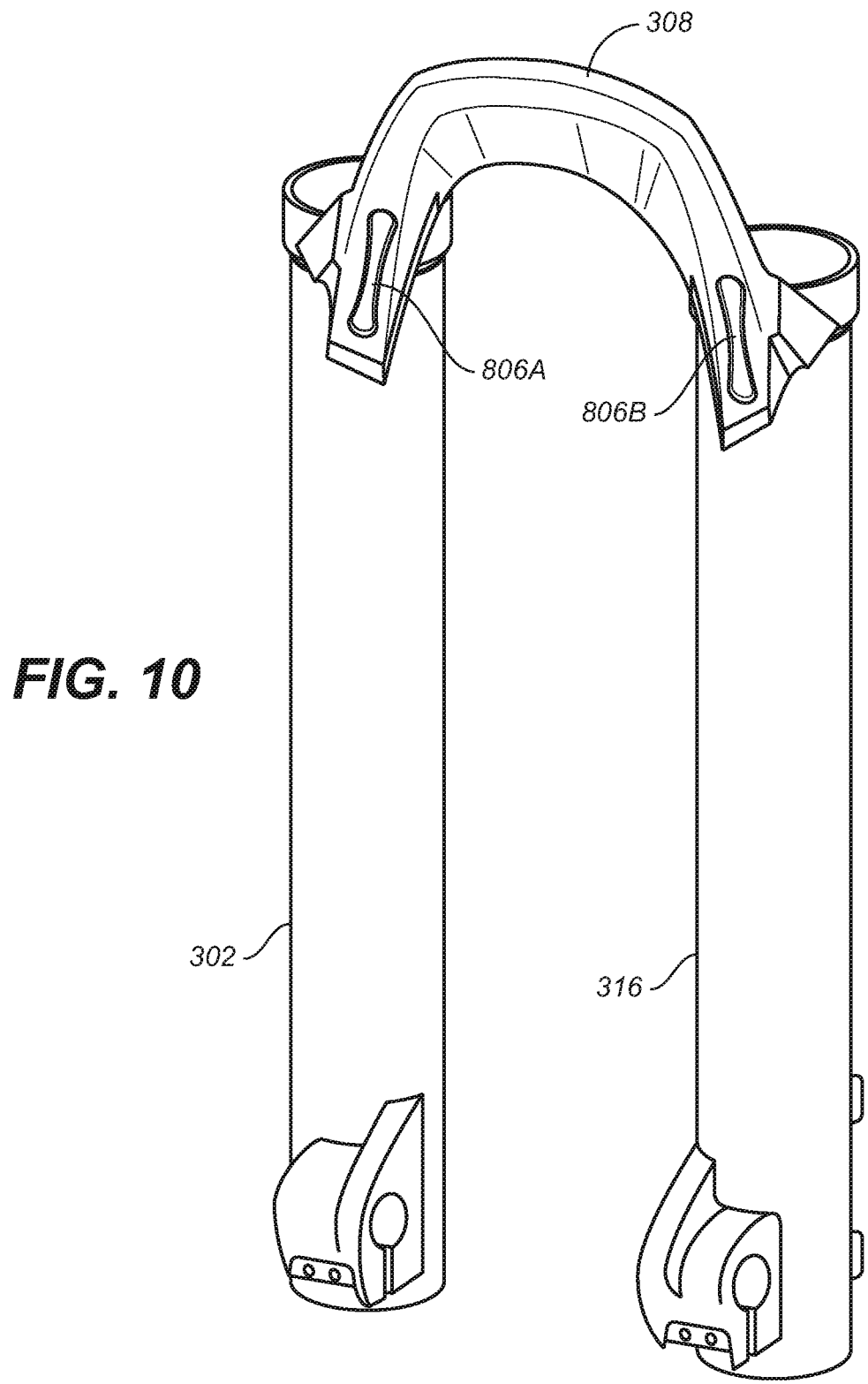
FIG. 10 is a ¾ perspective view of the brace of FIG. 3 coupling the right lower tube and the left lower tube, in accordance with an embodiment.

FIGS. 9 and 10 illustrate assembled embodiments of the lower fork alignment system, wherein the brace 308 couples the right lower tube 302 with the left lower tube 316, the set of screws 802 and 804 attaches the brace 308 to the right and left lower tubes 302 and 316, respectively. Molded covers 806A and 806B are also shown covering (hiding) the heads of the set of screws 802 and 804, respectively.

Figure 11:
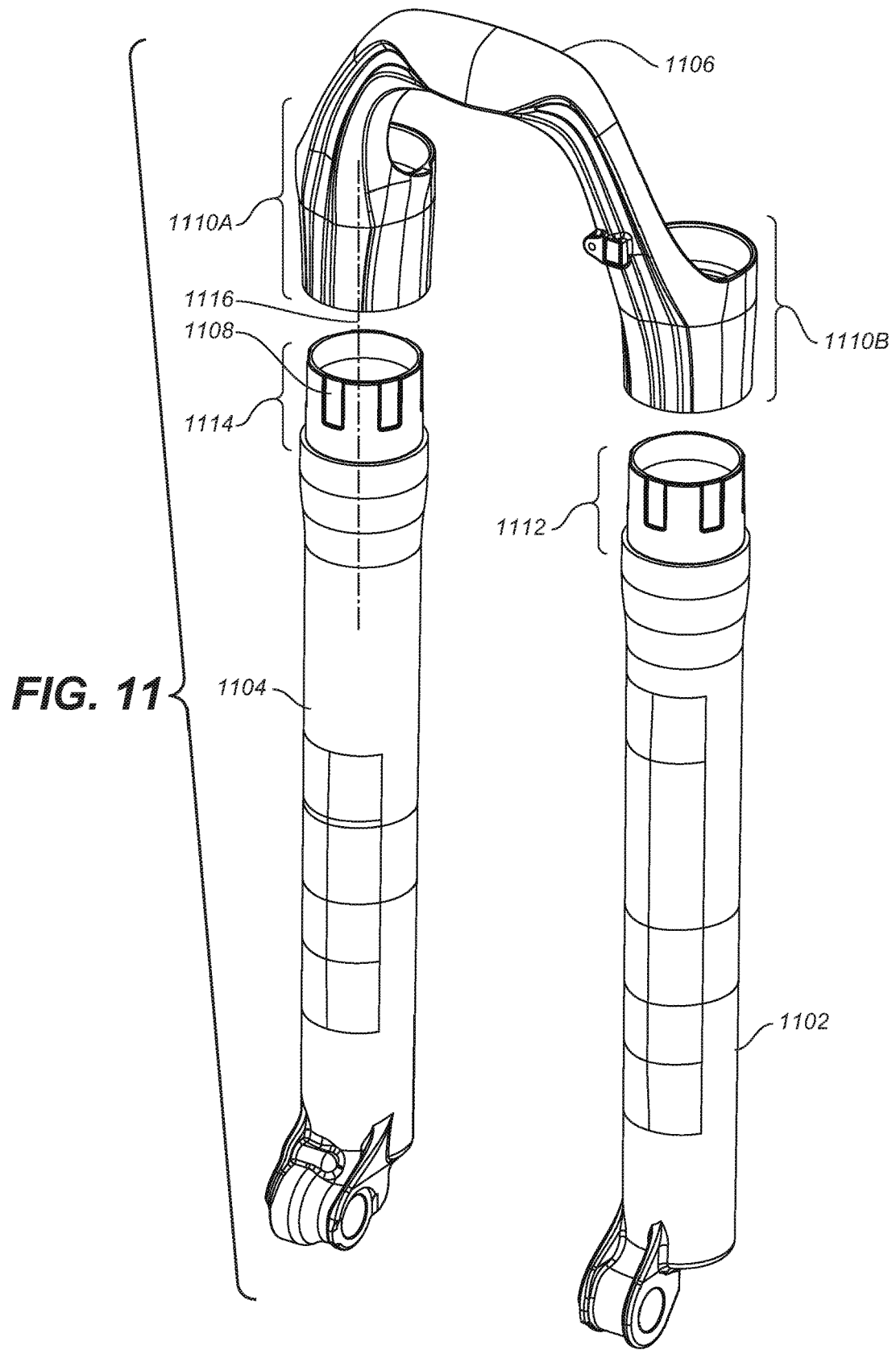
FIG. 11 is a ¾ perspective view of an exploded perspective view of a brace, a right lower tube and a left lower tube, in accordance with an embodiment.

FIG. 11 illustrates a brace 1106 for coupling the right lower tube 1104 and the left lower tube 1102, in accordance with an embodiment. The right lower tube 1104 has a first end 1114 and the left lower tube 1102 has a second end 1112. The first end 1114 includes a set of negative splines 1108. A negative spline of the set of negative splines 1108 is a depression within the first end 1114 that is formed to lie parallel with the vertical axis 1116. The brace 1106 includes the right brace shoulder 1110A and the left brace shoulder 11108. The inner surfaces (not shown) of the right brace shoulder 1110A and the left brace shoulder 11108 includes a set of positive splines configured for fitting within the set of negative splines 1108. A positive spline of the set of positive splines is a raised vertically shaped block and is formed such that the raised positive spline fits within the negative spline depression. According to embodiments, the raised positive splines are smaller in area than the negative spline depressions, such that when the right brace shoulder 1110A and the left brace shoulder 11108 are placed over the first end 1114 and the second end 1112 of the right lower tube 1104 and the left lower tube 1102, respectively, the right lower tube 1104 and the left lower tube 1102 may be rotated horizontally, vertically and rotationally within the fixture prior to a more permanent attachment mechanism being applied, such as, for example, glue.

FIG. 12 illustrates a front cross-sectional view of the brace coupling the right lower tube 1104 to the left lower tube 1102 of FIG. 11, in accordance with an embodiment. As shown, the right lower tube 1104 and/or the left lower tube 1102 may be adjusted in the horizontal direction 1204. Further, the right lower tube 1104 and/or the left lower tube 1102 may be adjusted in the vertical direction 1202 in relation to the brace 1106, in accordance with an embodiment.

FIG. 13 illustrates a side perspective view of the left lower tube 1104 and the brace 1106, in accordance with an embodiment. As shown, the left lower tube 1104 may be adjusted in the horizontal direction 1204.

Figure 14:
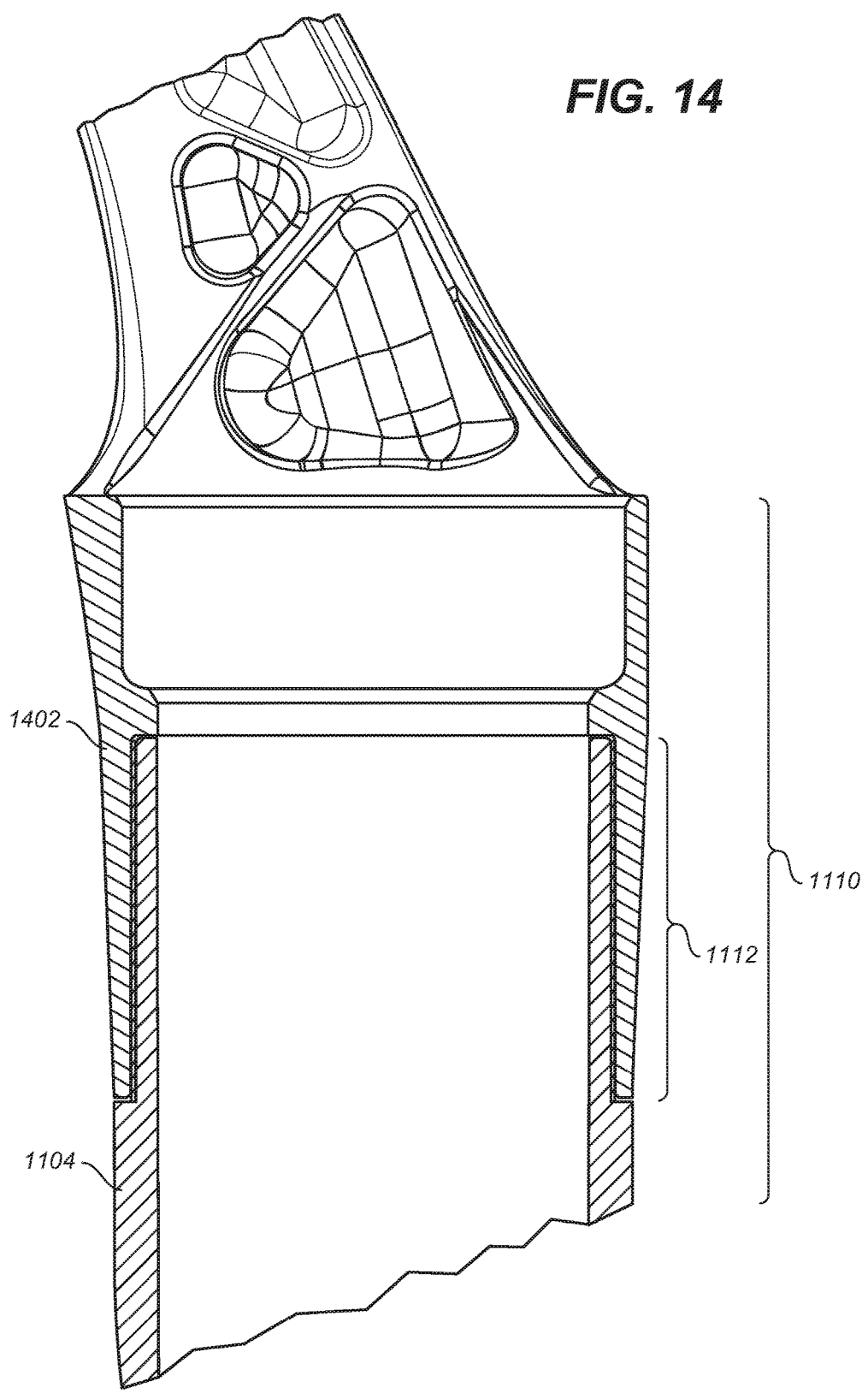
FIG. 14 is an enlarged front cross-sectional view of area A of FIG. 12, in accordance with an embodiment.

FIG. 14 illustrates an enlarged front cross-sectional view of the area A of FIG. 12. More particularly, FIG. 14 shows the left lower tube 1104, the second end 1112 described herein, and the left brace shoulder 11108 described herein. Further, the glue joint 1402 is positioned between the left brace shoulder 11108 and the second end 1112, in accordance with one embodiment. The glue joints enable improved alignment of the left and the right lower tubes 1102 and 1104 by allowing for horizontal, vertical and rotational adjustment in the fixture prior to glue being set.

FIG. 15 illustrates a brace 1506 coupling the right lower tube 1504 to the left lower tube 1502, in accordance with an embodiment. The brace 1506 includes the center bridge 1508. The center bridge 1508 is inserted horizontally at the top of the brace 1506. Before the center bridge 1508 is glued into place, the right lower tube 1504 and the left lower tube 1502 may be horizontally, vertically and/or rotationally adjusted. In accordance with an embodiment, the right lower tube 1504 and the left lower tube 1502 may be adjusted by being slid in the horizontal direction 1510 in relation to each other. Additionally, the right lower tube 1504 and the left lower tube 1502 may be rotationally adjusted, such as the rotational direction 1512.

FIG. 16 illustrates a side perspective view of the left lower tube 1502 of FIG. 15, in accordance with an embodiment. FIG. 16 shows that before the glue is set at glue joints 1704, the brace 1506 may be rotationally adjusted in the rotational direction 1602 or vertically adjusted in the vertical direction 1604.

Figure 17:
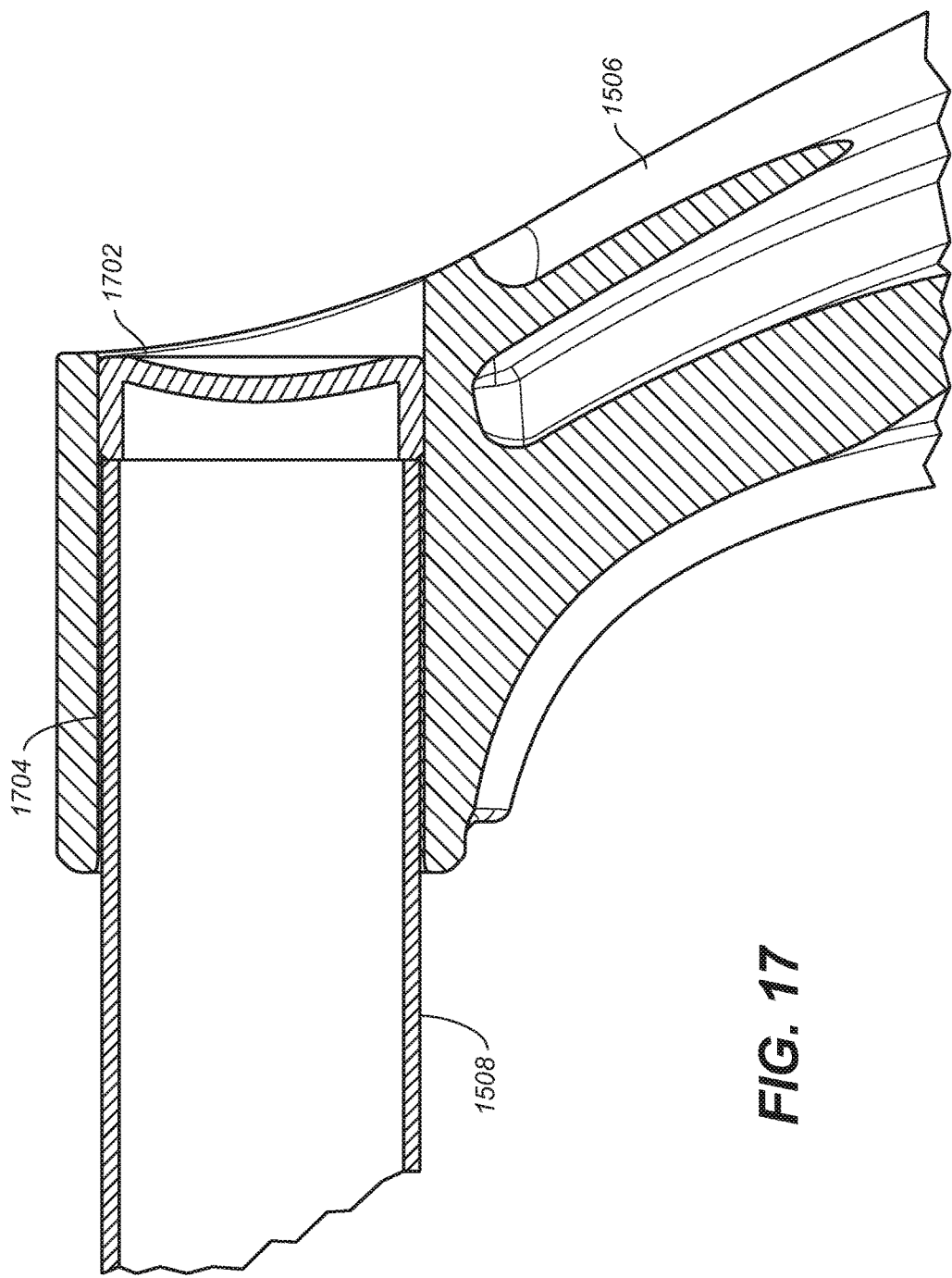
FIG. 17 is an enlarged front perspective view of the area A of FIG. 15, in accordance with an embodiment.

FIG. 17 illustrates the center bridge 1508 of FIG. 15 inserted into the brace 1506, which is capable of sliding in the horizontal direction 1510. Thus, the bridge 1508 enables the width adjustment of the lower fork, in accordance with embodiments. In one embodiment, either end of the bridge 1508 has attached thereto an end cap, such as the end cap 1702. In one embodiment, the end cap 1702 is made of elastomer and functions to seal the hollow center bridge 1508.

Thus, embodiments provide a variety of lower fork alignment system embodiments, allowing for the separate manufacture of the right lower tube, the left lower tube, and the brace and/or center bridge incorporated therein. By enabling this separate manufacture of these key components, each component may be more precisely and individually aligned relative to other components. The individual alignment mechanisms described herein enable the fork legs to be aligned in the same horizontal and vertical plane, thereby allowing for smoother fork operations. Thus, embodiments provide at least two axis of alignment whereby the brace may be assembled onto the lower fork legs and constrained once the brace is bolted to the lower fork legs.

It should be noted that any of the features disclosed herein may be useful alone or in any suitable combination. While the foregoing is directed to embodiments of the present invention, other and further embodiments of the invention may be implemented without departing from the scope of the invention, and the scope thereof is determined by the claims that follow.

I claim:

1. A lower tube of a lower fork, said lower tube comprising:
   a receiving adjustment mechanism disposed at a first end of said lower tube, wherein said receiving adjustment mechanism is configured for interfacing with a corresponding interface mechanism of a brace, wherein said receiving adjustment mechanism comprises:
      an alignment feature enabling at least one of a horizontal adjustment and a vertical adjustment of said lower tube, relative to another lower tube of said lower fork, along a corresponding at least one of a horizontal axis and a vertical axis, respectively.

2. The lower tube of claim 1, wherein said alignment feature comprises:
   at least one horizontally-shaped depression configured for receiving said corresponding interface mechanism of said brace, wherein upon said interfacing, said lower tube may be slid in a horizontal direction along said horizontal axis.

3. The lower tube of claim 1, wherein said alignment feature comprises:
   at least one vertically-shaped depression configured for interfacing with said corresponding interface mechanism of said brace, wherein upon said interfacing, said lower tube may be slid in a vertical direction along said vertical axis.

4. The lower tube of claim 1, wherein said receiving adjustment mechanism comprises:
   an attachment mechanism configured for providing a means for attaching said interface mechanism of said brace to said receiving adjustment mechanism.

5. The lower tube of claim 1, wherein said receiving adjustment mechanism enables rotational adjustment of said lower tube.

6. A lower tube of a lower fork, said lower tube comprising:
   a receiving adjustment mechanism disposed at a first end of said lower tube, wherein said receiving adjustment mechanism is configured for interfacing with a corresponding interface mechanism of a brace, wherein said receiving adjustment mechanism comprises:
      an alignment feature enabling a horizontal adjustment of said lower tube relative to another lower tube of said lower fork along a horizontal axis.

7. The lower tube of claim 6, wherein said alignment feature comprises:
   at least one horizontally-shaped depression configured for receiving said corresponding interface mechanism of said brace, wherein upon said interfacing, said lower tube may be slid in a horizontal direction along said horizontal axis.

8. The lower tube of claim 7, wherein said alignment feature comprises:
   at least one vertically-shaped depression configured for interfacing with said corresponding interface mechanism of said brace, wherein upon said interfacing, said lower tube may be slid in a vertical direction along a vertical axis.

9. The lower tube of claim 6, wherein said receiving adjustment mechanism comprises:
   an attachment mechanism configured for providing a means for attaching said interface mechanism of said brace to said receiving adjustment mechanism.

10. The lower tube of claim 6, wherein said receiving adjustment mechanism enables rotational adjustment of said lower tube.

11. A lower tube of a lower fork, said lower tube comprising:
    a receiving adjustment mechanism disposed at a first end of said lower tube, wherein said receiving adjustment mechanism is configured for interfacing with a corresponding interface mechanism of a brace, wherein said receiving adjustment mechanism comprises:
       an alignment feature alignment feature enabling a vertical adjustment of said lower tube relative to another lower tube of said lower fork along a vertical axis.

12. The lower tube of claim 11, wherein said alignment feature comprises:
    at least one vertically-shaped depression configured for receiving said corresponding interface mechanism of said brace, wherein upon said interfacing, said lower tube may be slid in a vertical direction along said horizontal axis.

13. The lower tube of claim 12, wherein said alignment feature comprises:
    at least one horizontally-shaped depression configured for interfacing with said corresponding interface mechanism of said brace, wherein upon said interfacing, said lower tube may be slid in a horizontal direction along a horizontal axis.

14. The lower tube of claim 11, wherein said receiving adjustment mechanism comprises:
    an attachment mechanism configured for providing a means for attaching said interface mechanism of said brace to said receiving adjustment mechanism.

15. The lower tube of claim 11, wherein said receiving adjustment mechanism enables rotational adjustment of said lower tube.

\* \* \* \* \*